(12) United States Patent
Griffin et al.

(10) Patent No.: US 9,703,390 B2
(45) Date of Patent: Jul. 11, 2017

(54) HAND-HELD ELECTRONIC DEVICE

(71) Applicant: BlackBerry Limited, Waterloo (CA)

(72) Inventors: Jason T. Griffin, Waterloo (CA); John A. Holmes, Waterloo (CA); Mihal Lazaridis, Waterloo (CA); Herb A. Little, Waterloo (CA); Harry R. Major, Waterloo (CA); Craig Dunk, Guelph (CA); Michael Brown, Heidelberg (CA); Jerome Lang, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/926,014

(22) Filed: Jun. 25, 2013

(65) Prior Publication Data

US 2013/0285918 A1 Oct. 31, 2013

Related U.S. Application Data

(63) Continuation of application No. 13/111,554, filed on May 19, 2011, now Pat. No. 8,493,322, which is a (Continued)

(51) Int. Cl.
*G06F 3/02* (2006.01)
*G06F 1/16* (2006.01)
(Continued)

(52) U.S. Cl.
CPC ............ *G06F 3/0219* (2013.01); *G06F 1/169* (2013.01); *G06F 1/1626* (2013.01);
(Continued)

(58) Field of Classification Search
CPC .......... G09G 5/00; H03K 17/94; G06F 17/21; G06F 15/00; H03M 11/00
(Continued)

(56) References Cited

U.S. PATENT DOCUMENTS

| 4,029,915 A | 6/1977 | Ojima |
| 4,449,839 A | 5/1984 | Bleuer |

(Continued)

FOREIGN PATENT DOCUMENTS

| EP | 0267801 | 5/1988 |
| EP | 0278169 | 8/1988 |

(Continued)

OTHER PUBLICATIONS

Sandberg-Diment, Erik; "Personal Computers; Artificial Intelligence: New Software Arrives"; Sep. 17, 1985; The New York Times; pp. 1-4.

(Continued)

*Primary Examiner* — Calvin C Ma
(74) *Attorney, Agent, or Firm* — Fish & Richardson P.C.

(57) ABSTRACT

A hand-held electronic device with a keyboard, thumbwheel, display and associated software is optimized for use of the device with the thumbs. The associated software has a plurality of features to optimize efficient use of the limited keyboard space and encourage the use of the device by thumb-based data entry through the thumbwheel and/or through a combination of minimal number of keystrokes. Software features include international character scrolling, and auto-capitalization. The keys on the device keyboard are optimally shaped and configured for thumb-based input. In addition, the thumbwheel is inclined between the front and a side edge of the device so as to be reachable by either the thumb or index finger of the user's hand at the side edge of the device.

15 Claims, 9 Drawing Sheets

Related U.S. Application Data continuation of application No. 11/561,540, filed on Nov. 20, 2006, now Pat. No. 7,969,419, which is a continuation of application No. 09/543,231, filed on Apr. 5, 2000, now Pat. No. 6,489,950, which is a continuation-in-part of application No. 29/108,876, filed on Aug. 5, 1999, now Pat. No. Des. 433,460, which is a continuation-in-part of application No. 09/344,432, filed on Jun. 25, 1999, now Pat. No. 6,396,482, which is a continuation-in-part of application No. 09/106,585, filed on Jun. 29, 1998, now Pat. No. 6,278,442, which is a continuation-in-part of application No. 29/089,942, filed on Jun. 26, 1998, now Pat. No. Des. 416,256.

(51) Int. Cl.
*G06F 3/0362* (2013.01)
*G06F 3/038* (2013.01)
*G06F 17/27* (2006.01)

(52) U.S. Cl.
CPC .......... *G06F 1/1656* (2013.01); *G06F 1/1664* (2013.01); *G06F 1/1684* (2013.01); *G06F 1/1698* (2013.01); *G06F 3/0362* (2013.01); *G06F 3/0383* (2013.01); *G06F 17/276* (2013.01)

(58) Field of Classification Search
USPC ....... 345/326, 168; 703/22; 707/517; 341/22
See application file for complete search history.

(56) References Cited

U.S. PATENT DOCUMENTS

| | | |
|---|---|---|
| D278,341 S | 4/1985 | Scheid |
| 4,625,557 A | 12/1986 | Rutherford |
| D293,241 S | 12/1987 | Wan et al. |
| RE32,686 E | 5/1988 | Dages |
| 4,804,279 A | 2/1989 | Berkelmans et al. |
| 4,953,120 A | 8/1990 | Nishiyama |
| D312,628 S | 12/1990 | Yokoi et al. |
| D313,401 S | 1/1991 | Tanabe |
| D313,413 S | 1/1991 | Langton |
| 5,044,291 A | 9/1991 | Kobayashi et al. |
| 5,059,048 A | 10/1991 | Sirkin |
| 5,178,477 A | 1/1993 | Gambaro |
| 5,184,830 A | 2/1993 | Okada et al. |
| 5,217,295 A | 6/1993 | Tortola et al. |
| 5,288,158 A | 2/1994 | Matias |
| D345,158 S | 3/1994 | Namba et al. |
| 5,331,337 A | 7/1994 | Kabeya et al. |
| 5,336,001 A | 8/1994 | Lichtenberg |
| 5,337,346 A | 8/1994 | Uchikura |
| 5,360,280 A | 11/1994 | Camacho et al. |
| 5,367,298 A | 11/1994 | Axthelm |
| D357,253 S | 4/1995 | Wong |
| 5,410,141 A | 4/1995 | Koenck et al. |
| 5,410,333 A | 4/1995 | Conway |
| 5,416,730 A | 5/1995 | Lookofsky |
| 5,426,449 A | 6/1995 | Danziger |
| D359,920 S | 7/1995 | Sakamoto |
| 5,436,954 A | 7/1995 | Nishiyama et al. |
| 5,436,960 A | 7/1995 | Campana, Jr. et al. |
| 5,444,763 A | 8/1995 | Lazaridis et al. |
| 5,457,454 A | 10/1995 | Sugano |
| D367,043 S | 2/1996 | Ross et al. |
| 5,500,643 A | 3/1996 | Grant |
| 5,543,787 A | 8/1996 | Karidis et al. |
| 5,555,241 A | 9/1996 | Lazaridis et al. |
| 5,559,800 A | 9/1996 | Mousseau et al. |
| 5,563,631 A | 10/1996 | Masunaga |
| 5,575,576 A | 11/1996 | Roysden, Jr. |
| 5,600,790 A | 2/1997 | Barnstijn et al. |
| 5,606,712 A | 2/1997 | Hidaka |
| 5,611,031 A | 3/1997 | Hertzfeld et al. |
| 5,619,531 A | 4/1997 | Taylor et al. |
| D381,021 S | 7/1997 | Williams et al. |
| 5,657,345 A | 8/1997 | Lazaridis |
| 5,659,307 A | 8/1997 | Karidis et al. |
| 5,661,605 A | 8/1997 | Conway |
| D383,756 S | 9/1997 | Henderson et al. |
| 5,666,138 A | 9/1997 | Culver |
| 5,672,108 A | 9/1997 | Lam et al. |
| D386,497 S | 11/1997 | Huslig et al. |
| 5,689,253 A | 11/1997 | Hargreaves et al. |
| D390,509 S | 2/1998 | Antzinas et al. |
| 5,715,387 A | 2/1998 | Barnstijin et al. |
| 5,727,020 A | 3/1998 | Taylor et al. |
| 5,732,346 A | 3/1998 | Lazaridis et al. |
| 5,737,394 A | 4/1998 | Anderson et al. |
| 5,754,737 A | 5/1998 | Gipson |
| 5,786,776 A | 7/1998 | Kisaichi et al. |
| D397,369 S | 8/1998 | Rissman |
| 5,797,089 A | 8/1998 | Nguyen |
| D397,728 S | 9/1998 | Yuen et al. |
| 5,802,312 A | 9/1998 | Lazaridis et al. |
| D399,537 S | 10/1998 | Chi et al. |
| 5,818,437 A * | 10/1998 | Grover et al. ............... 715/811 |
| 5,821,907 A | 10/1998 | Zhu et al. |
| 5,825,353 A | 10/1998 | Will |
| 5,827,082 A | 10/1998 | Laine |
| D402,572 S | 12/1998 | Han |
| D403,362 S | 12/1998 | Fai |
| 5,857,212 A * | 1/1999 | Van De Vanter ............ 715/234 |
| 5,861,821 A | 1/1999 | Kato et al. |
| 5,861,823 A | 1/1999 | Strauch et al. |
| 5,862,183 A | 1/1999 | Lazaridis et al. |
| 5,893,798 A | 4/1999 | Stambolic et al. |
| 5,912,661 A | 6/1999 | Siddiqui |
| 5,915,228 A | 6/1999 | Kunihiro et al. |
| 5,917,854 A | 6/1999 | Taylor et al. |
| 5,920,308 A | 7/1999 | Kim |
| 5,930,703 A | 7/1999 | Cairns |
| 5,931,873 A | 8/1999 | Cisar |
| 5,949,408 A | 9/1999 | Kang et al. |
| 5,963,197 A | 10/1999 | Bacon et al. |
| 5,966,098 A | 10/1999 | Qi et al. |
| 5,970,090 A | 10/1999 | Lazaridis |
| 5,974,238 A | 10/1999 | Chase, Jr. |
| 5,974,413 A | 10/1999 | Beauregard et al. |
| D416,024 S | 11/1999 | Johansson et al. |
| D416,256 S | 11/1999 | Griffin et al. |
| D417,219 S | 11/1999 | Barrette et al. |
| 5,982,520 A | 11/1999 | Weiser et al. |
| 5,982,613 A | 11/1999 | Sternglass et al. |
| 5,995,026 A | 11/1999 | Sellers et al. |
| 6,005,496 A | 12/1999 | Hargreaves et al. |
| 6,006,351 A | 12/1999 | Peretz et al. |
| 6,008,799 A | 12/1999 | Van Kleeck |
| 6,009,333 A | 12/1999 | Chaco |
| 6,014,429 A | 1/2000 | LaPorta et al. |
| 6,014,573 A | 1/2000 | Lehtonen et al. |
| 6,018,651 A | 1/2000 | Bruckert et al. |
| 6,018,770 A | 1/2000 | Little et al. |
| D420,351 S | 2/2000 | Waldner |
| 6,023,779 A | 2/2000 | Fullam et al. |
| 6,025,931 A | 2/2000 | Bloomfield |
| 6,031,505 A | 2/2000 | Qi et al. |
| 6,034,623 A | 3/2000 | Wandel et al. |
| 6,046,730 A | 4/2000 | Bowen et al. |
| 6,046,732 A | 4/2000 | Nishimoto |
| 6,047,047 A | 4/2000 | Aldridge et al. |
| 6,047,196 A | 4/2000 | Makela et al. |
| 6,047,197 A | 4/2000 | Jarrad |
| 6,049,796 A | 4/2000 | Siitonen et al. |
| 6,052,070 A | 4/2000 | Kivela et al. |
| 6,061,557 A | 5/2000 | Lazaridis et al. |
| 6,073,318 A | 6/2000 | Phillips |
| 6,075,470 A | 6/2000 | Little et al. |
| 6,084,576 A | 7/2000 | Leu et al. |
| 6,091,956 A | 7/2000 | Hollenberg et al. |
| 6,094,197 A | 7/2000 | Buxton et al. |

(56) References Cited

U.S. PATENT DOCUMENTS

| | | |
|---|---|---|
| 6,097,964 A | 8/2000 | Nuovo et al. |
| 6,102,594 A | 8/2000 | Strom |
| 6,103,979 A | 8/2000 | Motoyama et al. |
| 6,104,759 A | 8/2000 | Carkner et al. |
| 6,105,871 A | 8/2000 | Campo et al. |
| 6,107,988 A | 8/2000 | Phillipps et al. |
| 6,107,997 A | 8/2000 | Ure et al. |
| D432,511 S | 10/2000 | Eckholm |
| D433,017 S | 10/2000 | Martinez |
| D433,460 S | 11/2000 | Griffin et al. |
| 6,148,261 A | 11/2000 | Obradovich et al. |
| 6,157,323 A * | 12/2000 | Tso ............... G06F 3/0236 200/5 A |
| 6,160,383 A | 12/2000 | Carkner et al. |
| D436,591 S | 1/2001 | Abston et al. |
| 6,180,876 B1 | 1/2001 | Holmes |
| 6,191,551 B1 | 2/2001 | Fischer et al. |
| 6,198,474 B1 | 3/2001 | Roylance |
| 6,212,412 B1 | 4/2001 | Rogers et al. |
| 6,219,694 B1 | 4/2001 | Lazaridis et al. |
| D441,733 S | 5/2001 | Do et al. |
| 6,243,789 B1 | 6/2001 | Hasbun et al. |
| D445,428 S | 7/2001 | Pattenden |
| 6,255,915 B1 | 7/2001 | Edmonson |
| 6,256,011 B1 | 7/2001 | Culver |
| 6,262,609 B1 | 7/2001 | Hafez et al. |
| 6,271,605 B1 | 8/2001 | Carkner et al. |
| 6,278,442 B1 | 8/2001 | Griffin et al. |
| 6,295,052 B1 | 9/2001 | Kato et al. |
| 6,297,795 B1 | 10/2001 | Kato et al. |
| 6,304,261 B1 | 10/2001 | Shields et al. |
| 6,304,431 B1 | 10/2001 | Kim |
| 6,310,609 B1 | 10/2001 | Morgenthaler |
| D451,079 S | 11/2001 | Ali |
| 6,329,951 B1 | 12/2001 | Wen et al. |
| D454,349 S | 3/2002 | Makidera et al. |
| D454,849 S | 3/2002 | Eckholm |
| 6,356,258 B1 | 3/2002 | Kato et al. |
| 6,359,572 B1 | 3/2002 | Vale |
| 6,374,277 B2 | 4/2002 | Vong et al. |
| 6,380,711 B2 | 4/2002 | Fischer et al. |
| D456,794 S | 5/2002 | Laverick et al. |
| D457,308 S | 5/2002 | Infanti |
| 6,385,306 B1 | 5/2002 | Baxter, Jr. |
| 6,385,463 B1 | 5/2002 | Lieberman et al. |
| 6,389,457 B2 | 5/2002 | Lazaridis et al. |
| 6,396,482 B1 | 5/2002 | Griffin et al. |
| D458,239 S | 6/2002 | Shim et al. |
| D459,327 S | 6/2002 | Ali |
| 6,401,113 B2 | 6/2002 | Lazaridis et al. |
| 6,405,910 B1 | 6/2002 | Infanti et al. |
| D460,068 S | 7/2002 | Lanzaro et al. |
| D460,493 S | 7/2002 | Griffin et al. |
| 6,426,614 B1 | 7/2002 | Guthrie |
| D461,803 S | 8/2002 | Griffin et al. |
| 6,438,585 B2 | 8/2002 | Mousseau et al. |
| 6,452,588 B2 | 9/2002 | Griffin et al. |
| D464,995 S | 10/2002 | Griffin et al. |
| 6,459,968 B1 | 10/2002 | Kochie |
| 6,462,698 B2 | 10/2002 | Campbell et al. |
| 6,463,112 B1 | 10/2002 | Hafez et al. |
| 6,463,463 B1 | 10/2002 | Godfrey et al. |
| 6,463,464 B1 | 10/2002 | Lazaridis et al. |
| 6,473,733 B1 | 10/2002 | McArthur et al. |
| 6,477,529 B1 | 11/2002 | Mousseau et al. |
| 6,480,186 B1 | 11/2002 | McCabe et al. |
| 6,483,388 B2 | 11/2002 | Khan |
| D467,917 S | 12/2002 | Tischer |
| 6,489,950 B1 | 12/2002 | Griffin et al. |
| 6,490,589 B1 | 12/2002 | Weider et al. |
| 6,507,336 B1 | 1/2003 | Lunsford |
| 6,525,676 B2 * | 2/2003 | Kisaichi et al. ............... 341/22 |
| D472,225 S | 3/2003 | Griffin |
| 6,535,749 B1 | 3/2003 | Iwata et al. |
| 6,535,949 B1 | 3/2003 | Parker |
| 6,538,651 B1 | 3/2003 | Haymann et al. |
| D472,551 S | 4/2003 | Griffin |
| D473,226 S | 4/2003 | Griffin et al. |
| 6,570,462 B2 | 5/2003 | Edmonson et al. |
| 6,578,154 B1 | 6/2003 | Wyen et al. |
| 6,580,163 B2 | 6/2003 | Poulin |
| 6,583,601 B2 | 6/2003 | Simoes et al. |
| D476,985 S | 7/2003 | Griffin |
| 6,586,993 B2 | 7/2003 | Macedo |
| D478,585 S | 8/2003 | Griffin |
| 6,608,616 B2 | 8/2003 | Lin et al. |
| 6,611,254 B1 | 8/2003 | Griffin et al. |
| 6,611,255 B2 | 8/2003 | Griffin et al. |
| D479,233 S | 9/2003 | Griffin |
| D479,714 S | 9/2003 | Donner |
| 6,614,866 B2 | 9/2003 | Hafez et al. |
| 6,618,697 B1 * | 9/2003 | Kantrowitz et al. ............ 703/22 |
| D480,722 S | 10/2003 | Griffin et al. |
| 6,630,924 B1 | 10/2003 | Peck et al. |
| D482,353 S | 11/2003 | Helin |
| 6,647,367 B2 | 11/2003 | McArthur et al. |
| 6,731,227 B2 | 5/2004 | Horie |
| 6,744,890 B1 | 6/2004 | Le et al. |
| 6,842,169 B2 | 1/2005 | Griffin et al. |
| 6,867,763 B2 | 3/2005 | Griffin et al. |
| 6,873,317 B1 | 3/2005 | Griffin et al. |
| 6,919,879 B2 | 7/2005 | Griffin et al. |
| 6,973,052 B2 | 12/2005 | Wang et al. |
| 7,158,120 B2 | 1/2007 | Griffin et al. |
| 7,227,536 B2 | 6/2007 | Griffin et al. |
| 7,319,461 B2 | 1/2008 | Griffin et al. |
| 7,395,089 B1 | 7/2008 | Hawkins et al. |
| 7,495,660 B2 | 2/2009 | Griffin et al. |
| 7,629,964 B2 | 12/2009 | Griffin et al. |
| 7,639,241 B2 | 12/2009 | Griffin et al. |
| 7,705,828 B2 | 4/2010 | Griffin et al. |
| 7,952,571 B2 | 5/2011 | Griffin et al. |
| 7,969,419 B2 | 6/2011 | Griffin et al. |
| 8,144,135 B2 | 3/2012 | Griffin et al. |
| 8,416,195 B2 | 4/2013 | Griffin et al. |
| 8,464,149 B2 | 6/2013 | Griffin et al. |
| 8,493,322 B2 | 7/2013 | Griffin et al. |
| 2001/0044828 A1 | 11/2001 | Kikinis |
| 2001/0048589 A1 | 12/2001 | Brandenberg |
| 2002/0054676 A1 | 5/2002 | Zhao et al. |
| 2002/0072395 A1 | 6/2002 | Miramontes |
| 2002/0146989 A1 | 10/2002 | Moriki |
| 2002/0158844 A1 | 10/2002 | McLoone et al. |
| 2003/0006968 A1 | 1/2003 | Solomon |
| 2003/0025673 A1 | 2/2003 | Ledbetter et al. |

FOREIGN PATENT DOCUMENTS

| | | |
|---|---|---|
| EP | 0538020 | 4/1993 |
| EP | 0685801 | 12/1995 |
| EP | 0732646 | 9/1996 |
| EP | 0760291 | 3/1997 |
| EP | 1143327 | 10/2001 |
| JP | 64-35429 | 8/1987 |
| JP | H04-102911 | 4/1992 |
| WO | 96/04618 | 2/1996 |
| WO | 9833111 | 7/1998 |
| WO | 9937025 | 7/1999 |
| WO | 0030381 | 5/2000 |
| WO | 0038041 | 6/2000 |
| WO | 0074240 | 12/2000 |
| WO | 0150335 | 7/2001 |

OTHER PUBLICATIONS

Mastering Microsoft Office 97, Moseley et al. 1996, pp. 316-316.
"Programmable Calculators: Hewlett-Packard HP-200LX," Viktor T. Toth, copyr. 2001, 2002, from web page at www.rskey.org/hp200lx.html.
"Triangular Toggle Keys for Touch-Tone Phones," IBM Technical Disclosure Bulletin, vol. 31, No. 1, Jun. 1, 1988, pp. 47-49, NY, US.
Canadian Office Action dated Jun. 23, 2011, which issued in Canadian Application No. 2,547,927 (3 pages).

(56) References Cited

OTHER PUBLICATIONS

Office Action for U.S. Appl. No. 11/561,540 dated Jan. 27, 2011 (8 pages).
Photo of AEG 1995 Product, photo date unknown, product said by Nitirika ti be available in 1995 (1 page).
Photo of Ether Age ClipKee MiniKeyboard Product, photo date unknown, advertising related to the product said by Motorola to be available Jul. 2001 (1 page).
Photo of Handspring Treo 180 Product, photo of date unknown, product said by Motorola to be available in 1997 (1 page).
Photo of Husky Field Explorer 21 Product, photo date unknown, product said by Motorola to be available in Mar./Apr. 1999 (1 page).
Photo of Motorola t900 Product, photo date unknown, product said by Motorola to be available on Jan. 6, 2000 (1 page).
Photo of Motorola 1997 Product, photo dated unknown, product said by Motorola to be available in 1997 (1 page).
Photo of Motorola Page Writer 2000 Product, photo date unknown, product said by Motorola to be available in early 1997 (1 page).
Photo of Motorola Page Writer 250 Product, photo date unknown, product said by Motorola to be available by early 1997 (1 page).
Photo of NEC Talktime 800 Series Product and product literature, photo date unknown, user guide said by Motorola to be available in 1996, 1997 (37 pages).
Photo of Nokia 9000 Communication Product, photo date unknown, product said by Motorola to be available in 1996 (1 page).
Photo of Phillips Velo 1 Product, photo date unknown, product said by Motorola to be available in Aug. 1997 (1 page).
Photo of RIM 850/950 Product, product announcement, photo date unknown, product (RIM 950) said by Motorola to be available on Sep. 1, 1998 (1 page).
Photo of RIM 857 180 Product, photo date unknown, product said by Motorola to have been released in Oct. 2000 (1 page).
Photo of RIM Inter@active Pager 800/900, photo date unknown, product said by Motorola to be available in 1996 (1 page).
Portion of "Motorola Inc.'s First Supplemental Response to First Set of Interrogatories (No. 14)" (pp. 1-7) and Exhibit A appended to the Response, Jul. 15, 2009 (27 pages).
Research in Motion Ltd./RAM Mobile Data Supply Agreement pertaining to RIM 850-950 Product; Jun. 27, 1997 (23 pages).
Office Action in Canadian Application No. 2,547,927 mailed by the Canadian Patent Office on Dec. 3, 2012 (3 pages).
Office Communication issued by the Canadian Intellectual Property Office in Canadian Application No. 2,547,927, dated Feb. 13, 2014 (4 pages).
United States Office Action in U.S. Appl. No. 13/111,596, dated Feb. 23, 2015, 16 pages.
Non-Final Office Action mailed Aug. 15, 2001 in U.S. Appl. No. 09/344,432.
Final Office Action mailed Dec. 5, 2001 in U.S. Appl. No. 09/344,432.
Non-Final Office Action mailed Feb. 17, 2012 in U.S. Appl. No. 13/244,790.
Final Office Action mailed Jul. 5, 2012 in U.S. Appl. No. 13/244,790.
Office Action issued in Canadian Application No. 2,547,927 on Dec. 9, 2014; 4 pages.
Office Action issued in Canadian Application No. 2,517,815 on Apr. 14, 2009 (2 pages).
Office Action in Canadian Application No. 2,547,927 mailed by the Canadian Patent Office on Mar. 26, 2010 (3 pages).
Office Action in Canadian Application No. 2,276,698 mailed by the Canadian Patent Office on Mar. 26, 2002 (3 pages).
Office Action in Canadian Application No. 2,389,985 mailed on May 14, 2008 (3 pages).
Office Action in Canadian Application No. 2,389,985 mailed on Jul. 8, 2011 (3 pages).
Office Action in Canadian Application No. 2,395,021 mailed on Dec. 22, 2004 (4 pages).
Office Action in Canadian Application No. 2,276,697 mailed on Mar. 26, 2002 (3 pages).
Office Action in Canadian Application No. 2,357,562 mailed on Apr. 14, 2003 (3 pages).
European Search Report dated Jul. 23, 2001 for European Application No. 01108508.1 (3 pages).
Office Action dated Apr. 2, 2003 for European Application No. 01108508.1 (5 pages).
Office Action issued in Canadian Application No. 2,547,927 on Mar. 27, 2017.

\* cited by examiner

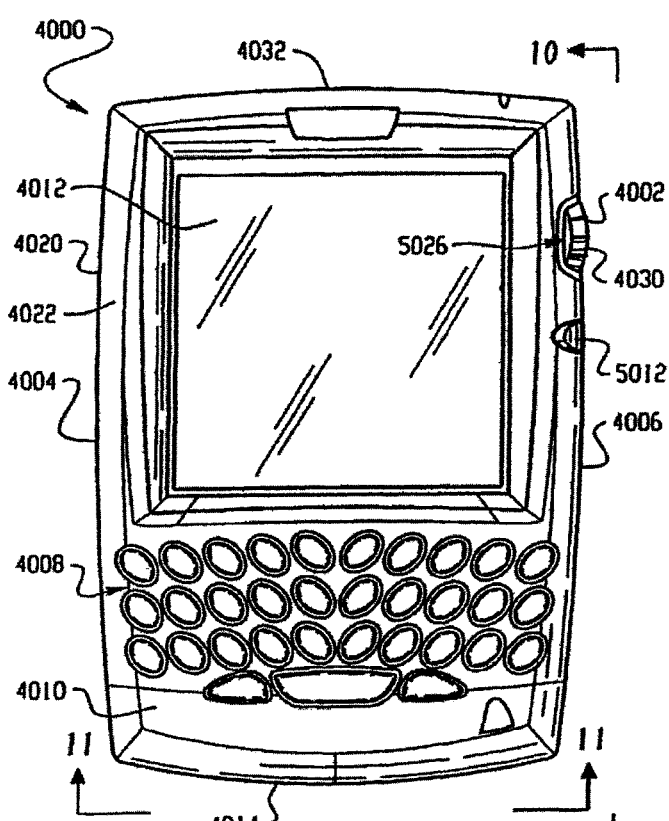
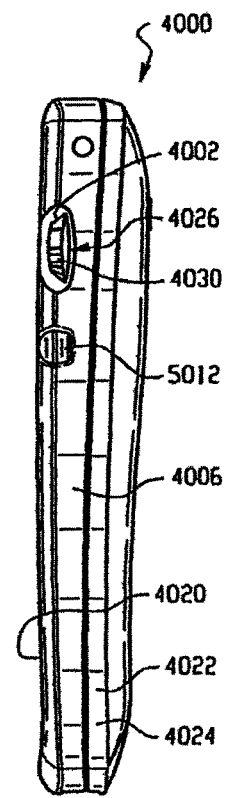
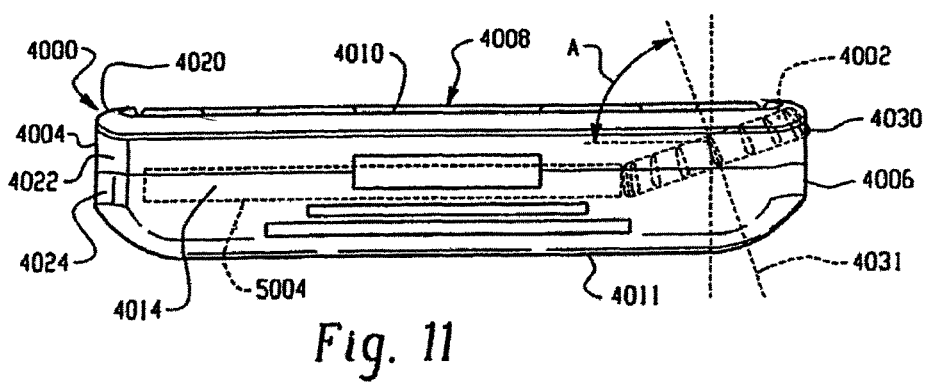
Fig. 9
Fig. 10
Fig. 11

HAND-HELD ELECTRONIC DEVICE

This is a continuation of U.S. patent application Ser. No. 13/111,554, entitled "Hand-Held Electronic Device," filed May. 19, 2011, which is a continuation of U.S. patent application Ser. No. 11/561,540, entitled "Hand-Held Electronic Device," filed Nov. 20, 2006, which is a continuation of U.S. patent application Ser. No. 09/543,231, entitled "Hand-Held Electronic Device With Auxiliary Input Device," Apr. 5, 2000, which is a continuation-in-part of U.S. Design patent application Ser. No. 29/108,876, entitled continuation-in-part of U.S. patent application Ser. No. 29/108,876, entitled "Hand-Held Electronic Device," Aug. 5, 1999, now U.S. Pat. No. Des. 433,460, and further is a continuation-in-part of U.S. patent application Ser. No. 09/344,432, entitled "Hand-Held Electronic Device With A Keyboard Optimized For Use With The Thumbs," filed Jun. 25, 1999, now U.S. Pat. No. 6,396,482, which is a continuation-in-part of U.S. patent application Ser. No. 09/106,585, entitled "Hand-Held Electronic Device With A Keyboard Optimized For Use With The Thumbs," filed Jun. 29, 1998, now U.S. Pat. No. 6,278,442, which in turn is a continuation-in-part of U.S. Design application Ser. No. 29/089,942, entitled "Hand-Held Messaging Device With Keyboard," filed Jun. 26, 1998, now U.S. Patent No. Des. 416,256, all of which are incorporated herein by reference.

BACKGROUND OF THE INVENTION

The present invention is directed toward the field of small, hand-held elect-Ionic devices such as personal data assistants (PDA's), personal information managers (PIM's), two-way pagers and the like. In particular, the system and method of the present invention provide the user of the hand-held device with the ability to input data with a minimal amount of key strokes and optimized for use substantially with the thumbs.

In a two-way paging system that provides two-way, full text messaging, there is a need to permit the user to initiate messages and to respond to messages in a timely fashion and with text entirely created by the user. In order to keep the form factor of the two-way pager small enough to be worn on the body of the user, such as with a belt clip, the input device needs to be small, have a minimal number of keys and optimized for use with a minimal number of key strokes. Prior art systems have attempted to address these needs by incorporating virtual keyboards or pen-based input systems for user inputs to the device, but such systems require the user to input data in an unfamiliar manner. Additionally, in a small hand-held messaging device, such as a two-way pager, these systems prove awkward to use.

In order to provide a hand-held electronic device that permits a user the opportunity to enter data into an address book, a calendar, a task list, an email message or a similar text file that requires user-generated data, the instant invention is directed to an input device that is oriented to be used substantially through use of the thumbs. This is accomplished first by providing a keyboard with a minimal number of keys, but with the keys representing the alphabet generally placed in the same order as they would appear on a standard keyboard, such as in a standard QWERTY or a DVORAK keyboard layout. The use of a keyboard layout that is familiar to the user enables the user to immediately use the device without having to hunt for the keys he or she wishes to use.

Although the layout is similar to a standard keyboard, the keys are placed at an orientation 10 and in a particular shape that attempts to maximize the surface area of the thumb hitting the key and to provide the user with a comfortable position of the hands for data input. Also, the orientation encourages input by the thumbs, which the inventors of the instant invention have discovered to be faster and more accurate in small hand-held electronic devices than touch-typing or "hunting and pecking" typing.

An additional feature of the invention is the use of an additional input means for control of functions that might otherwise be controlled by a keyboard that included function keys. To encourage data entry using thumbs and again to minimize the number of keys on the keyboard, the instant invention also includes a thumb-wheel for control of menus for selection of forms and functions relevant to data input. As discussed below, one of the data forms the thumbwheel is implemented to accommodate is a special character set. The thumb-wheel is positioned in close proximity to the keyboard to enable the easily transition from thumb-based typing to thumb control of forms and functions.

In addition to hardware features that encourage optimal data entry though the use of thumbs, there are several software features that are designed to minimize keystrokes and aid in entry of data.

The features of this invention, both individually and collectively, have not, to the knowledge of the inventors, been applied to a small hand-held electronic device that requires user-generated data entry. To permit efficient operation of such devices while keeping the form factor of the device small enough to be worn on the body, there is a general need for a hand-held electronic device that can fit in the palm of the hand and that can be operated substantially with the thumbs.

There is a further need for a keyboard for a palm-size data entry device with keys placed at an angle to optimize operation of the keyboard by the use of the thumbs.

There remains another need for a keyboard with keys that are shaped arid sized to maximize contact with the thumbs while minimizing the keyboard area required for such keys.

There also remains a need for an auxiliary input device that is to be operated by the thumb for data inputs forms and function control and that, in conjunction with the keyboard, encourages and permits data entry and management through input performed substantially by the thumbs.

There remains still another need for a software-implemented user interface system that is designed, at least in part, to support and encourage data entry through use of the thumbs.

There remains another need for facilitating entry of special or international characters with the thumbs while limiting the keyboard area.

There remains another need for automatically entering certain common punctuation thereby reducing repetitive key entry and increasing the speed of data entry.

There remains another need for automatically entering certain common phrases or electronic signatures without tediously typing the full phrase or electronic signature.

There remains another need for easily removing automatic features when such features are not desired.

There remains another need for executing a set of common instructions for a particular task with a minimum of use-r data entry.

SUMMARY OF THE INVENTION

The present invention overcomes the problems noted above and satisfies the needs in this field for a hand-held electronic device with a keyboard optimized for use with the thumbs. in the preferred embodiment of the present invention, the hand-held electronic device is a two-way paging or wireless email device (such as the Inter@ctive™ pager manufactured and marketed by the assignee of the present invention) that permits full-text, two-way messaging such as email messaging. The device may also include standard PDA or PTA features such as an address book, an electronic calendar, a task list and other text-based features. Such features require user input of text strings that can be lengthy and that cannot be reduced to pre-determined or "canned" strings. Thus, for such a device, the efficient entry of data in a device meant to fit into the palm of one's hand requires that two goals are achieved. First, the data entry must be relatively easy from a user perspective. This means that the user must be somewhat familiar with analogous forms of data entry and not have to be trained to use the data entry for the hand-held device. Second, the form factor does not permit a large number of keys or keys that are very large. Thus, efficient use of the keyboard space is required and functions that might be able to be performed by a standard keyboard are off-loaded to an auxiliary input device or are performed, through a normal number of keystrokes that encourage the use of thumb-based data entry.

To accomplish these goals, the invention first optimizes the placement of the keys on the device keyboard. In order to work within the limited space available for the keyboard, it was determined that it was preferable to use keys that were oval or oblong and that were placed at angles designed to facilitate use by thumb typing. An angle for the keys on the right side of the keyboard and a complementary angle for the keys on the left side of the keyboard are chosen based upon observation of the angle at which a user will orient his or her thumbs while thumb-typing.

The invention also minimizes the number of keys available or required for data input. In the preferred embodiment, only keys for the 26 letters of the English alphabet are available as well as a backspace key, a line feed key, an "alt" key, a "cap" key and a space bar.

The alt key enables the user in conjunction the other keys to input numbers and symbols to perform certain functions. The placement of the keys is designed to enhance the user experience while typing with the thumbs by meeting two seemingly opposite goals—minimizing the keyboard footprint while maximizing the likelihood that p-roper keys will be struck by the thumb-typing user.

Alternative embodiments could include fewer or more keys, including, for example function keys or control keys. The form factor, however, generally limits the number of keys that may be implemented if the goal of facilitating thumb typing is to be met.

The invention also provides additional incentive for the user to use thumb input by providing an input device adjacent to the keyboard, but integral to the overall handheld device. Although other devices can be used in an auxiliary fashion, the preferred device is a thumbwheel that registers movement of the wheel by measuring the number of indents traversed while rolling the wheel and that also registers as an input the depression or "clicking" of the wheel, which is performed by pressing the wheel toward the back of the pager. This clicking of the wheel is similar to the clicking of a mouse associated with a PC or any other input device that—registers the depression of a button. The thumbwheel in the preferred embodiment is placed vertically on the two-way paging device so that the user can easily move his or her thumb from the thumbwheel to the keyboard and back for performing functions and retrieving data forms, such as an email template or address book entry template, for data entry.

Additionally, various software techniques can be implemented to enhance the thumb typing user's experience in using the device of the instant invention. in the preferred embodiment, for example, the user can change the capitalization of a particular letter simply by keeping a key depressed for a particular length of time without an intermittent release being detected by the keyboard controller.

According to an aspect of the present invention there is provided a method of changing the character display of a key on a keyboard of a handheld wireless communications device comprising the steps of: receiving a first input from a depression of a keyboard key, the first input defining a first character associated with the depressed keyboard key; receiving a second input from an auxiliary input device in conjunction with the continual depression of the keyboard key; initiating of an altering character condition and processing the altering character condition; and, modifying the first character and submitting for display a second character associated with the depressed keyboard key.

According to another aspect of the present invention there is provided a method of modifying the character display of a key on a keyboard comprising the steps of: receiving a first input from a depression of a keyboard key, the first input associating a first character associated with the depressed keyboard key; initiating of an altering character condition upon a continual depression of the keyboard key beyond a predefined period of time; processing the altering character condition; and, modifying the first character and submitting for display a second character.

According to another aspect of the present invention there is provided a handheld two-way wireless communications device optimally configured for use with the thumbs of a user comprising, a keyboard; an auxiliary input device positioned in relative proximity to the keyboard and control logic circuitry associated with the auxiliary input device; a display positioned adjacent to the keyboard; a microprocessor to control the operation of the device; and, a software application residing in the communications device for providing a plurality of thumb-based operational features, the software application initiating certain operational features upon certain inputs from the keyboard or the auxiliary input device.

According to another aspect of the present invention there is provided a hand-held two-way wireless communications device optimally configured for use with the thumbs of a user comprising: a keyboard having a first set of keys and a second set of keys, wherein the first set of keys is positioned a positive predetermined degree relative to a vertical reference and the second set of keys is positioned a negative predetermined degree relative to the vertical reference; an auxiliary input device positioned in relative proximity to the keyboard; a display positioned adjacent to the keyboard; software residing in the communications device for providing functionality to inputs received from the auxiliary input device and the keyboard.

According yet to another aspect of the present invention there is provided a handheld two-way wireless communications device as described above, and having an auxiliary input device comprising a thumbwheel in a vertical orientation at the front of the device. In an alternative embodiment, the thumbwheel is inclined from the vertical orientation. The inclined thumbwheel is more easily accessible to either the thumb or index finger of a user's hand at the side edge of the device. Moreover, the easier accessibility allows the user to advantageously hold and operate the device in different ways, namely: a single-handed operation and a two-handed operation.

The primary advantage of the present invention is that it enables efficient and user friendly data entry into a palm-sized electronic device by maximizing the potential for user data entry through thumb typing.

These are just a few of the many advantages of the present invention, as described in more detail below. As will be appreciated, the invention is capable of other and different embodiments and its several details are capable of modifications in various respects, all without departing from the spirit of the invention. Accordingly, the drawings and description of the preferred embodiment set forth bellow are to be regarded as illustrative in nature and not restrictive.

BRIEF DESCRIPTION OF THE DRAWINGS

The present invention satisfies the needs note above as will become apparent from the following description when read in conjunction with the accompanying drawings wherein:

FIG. 9 is a view similar to FIG. 2 showing a hand-held device comprising an alternative embodiment of the invention;

FIG. 10 is a view taken on line 10-10 of FIG. 9;

FIG. 11 is a view taken on line 11-11 of FIG. 9;

DETAILED DESCRIPTION OF THE INVENTION

Figure 1:
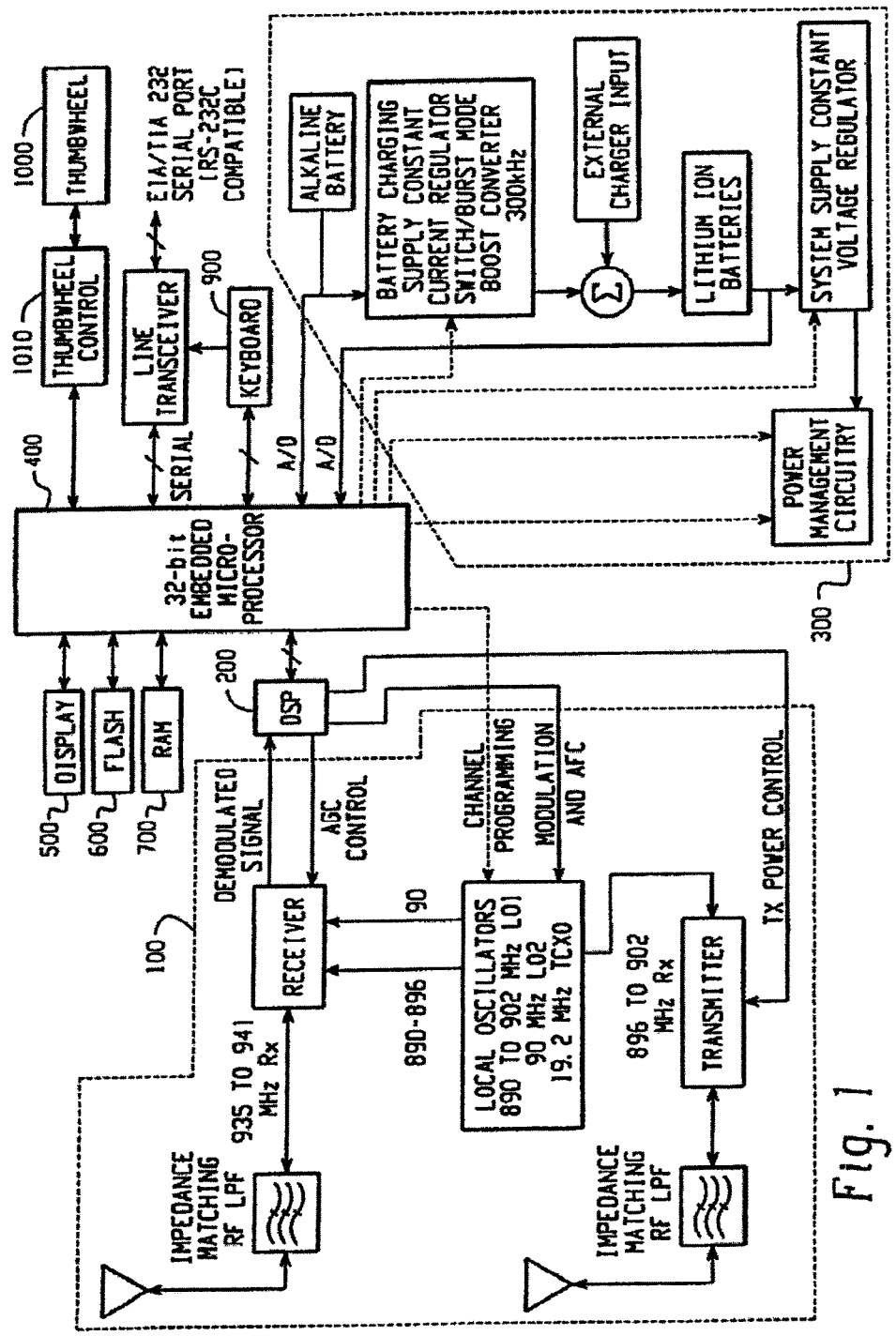
FIG. 1 is a block diagram of a two-way, full-text, messaging device incorporating a keyboard and an auxiliary data entry device.

Referring now to the drawings, FIG. 1 is a block diagram of the major subsystems and elements comprising a palm-sized, mobile, two-way messaging device that preferably incorporates the invention. f n its broadest terms, the messaging device includes a transmitter/receiver subsystem 100 connected to a DSP 200 for digital signal processing of the incoming and outgoing data transmissions, power supply and management subsystem 300, which supplies and manages power to the overall messaging device components, microprocessor 400, which is preferably an X86 architecture processor, that controls the operation of the messaging device, display 500, which is 5 preferably a full graphic LCD, FLASH memory 600, RAM 700, serial output and port 800, keyboard 900, thumbwheel 1000 and thumbwheel control logic 1010. In its intended use, a message comes via a wireless data network, such as the Mobitex network, into subsystem 100, where it is demodulated via DSP 200 and decoded and presented to microprocessor 300 for display on display 500. To access the display of the message, the user may choose from functions listed under a menu presented as a result of user interaction with thumbwheel 1000. If the message is an email message, the user may chose to respond to the email by selecting "Reply" from a menu presented on the display through interaction via thumbwheel 1000 or via menu, selection from keyboard 900. In typing the reply, the user can use keyboard 900 to type full text message replies, or insert predetermined or "canned" response by using either a particular keystroke pattern or through pulling down predetermined text strings from a menu of items presented on display 500 through the use of thumbwheel 1000. When the reply to the message is composed, the user can initiate the sending of the message preferably by interaction through thumbwheel 1000, or alternatively, with less efficiency, through a combination of keyboard 900 keystrokes. When the microprocessor 300 receives an indication that the message is to be sent, it processes the message for transport and, by directing and communicating with transmitter/receiver subsystem 100, enables the reply message to be sent via the wireless communications data network to the intended recipient. Similar interaction through I/O devices keyboard 900 and thumbwheel 1000 can be used to initiate full-text messages or to forward messages to another party. Also, the keyboard 900 and thumbwheel 1000 can be used to permit data entry to an address book resident on the messaging device, or an electronic calendar or log book, or any other function on the messaging device requiring data entry. Preferably, the thumbwheel is a thumbwheel with a push button SPST with quadrature signal outputs, such as that manufactured by Matsushita Electronic Components Co.'s, Ltd. as part number EVQWK2001.

Figure 2:
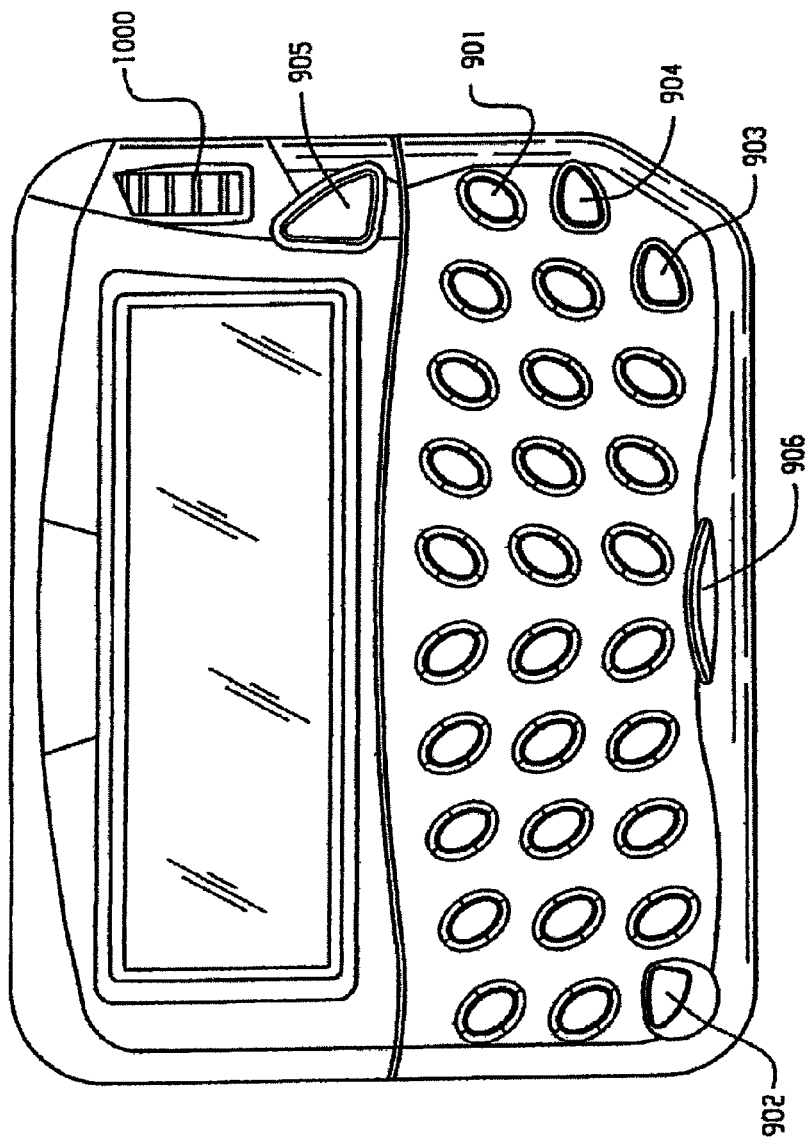
FIG. 2 is a frontal view of the hand-held device showing the shape and placement of the keys on the keyboard and the auxiliary input device.

FIG. 2 is a front view of messaging device 10 that incorporates the invention. The device 10 is shown in FIG. 2 in the ordinary operating/viewing position in which it would be held by and between the user's hands at the left and right side edges 12 and 14 of the device 10. The keyboard 900 is thus elongated horizontally across the front 16 of the device 10. Shown in FIG. 2 are a plurality of letter keys 901, and specialized keys 902, 903, 904 and 905 and space bar 906. Also shown is the thumbwheel 1000 in its vertical orientation at the front side 16 of the device 10 in association with display 500 and keyboard 900. By "vertical" it is meant that the thumbwheel 1000 is oriented with its circular opposite sides 1002 and 1004 in vertical planes when the device 10 is viewed directly from the front in the ordinary operating/viewing position, as shown in FIG. 2. The axis 1005 of rotation then extends from left to right across the device 10 as a horizontal line parallel to the lengthwise direction of the keyboard 900. The thumbwheel 1000 can roll about the axis 1005 up toward the upper edge 20 of the device 10 or down toward the lower edge 22 of the device 10. In the preferred embodiment, 902 is the alt key, 903 is the cap key, 904 is the line feed (blank space) key and 905 is the backspace key.

Figure 3:
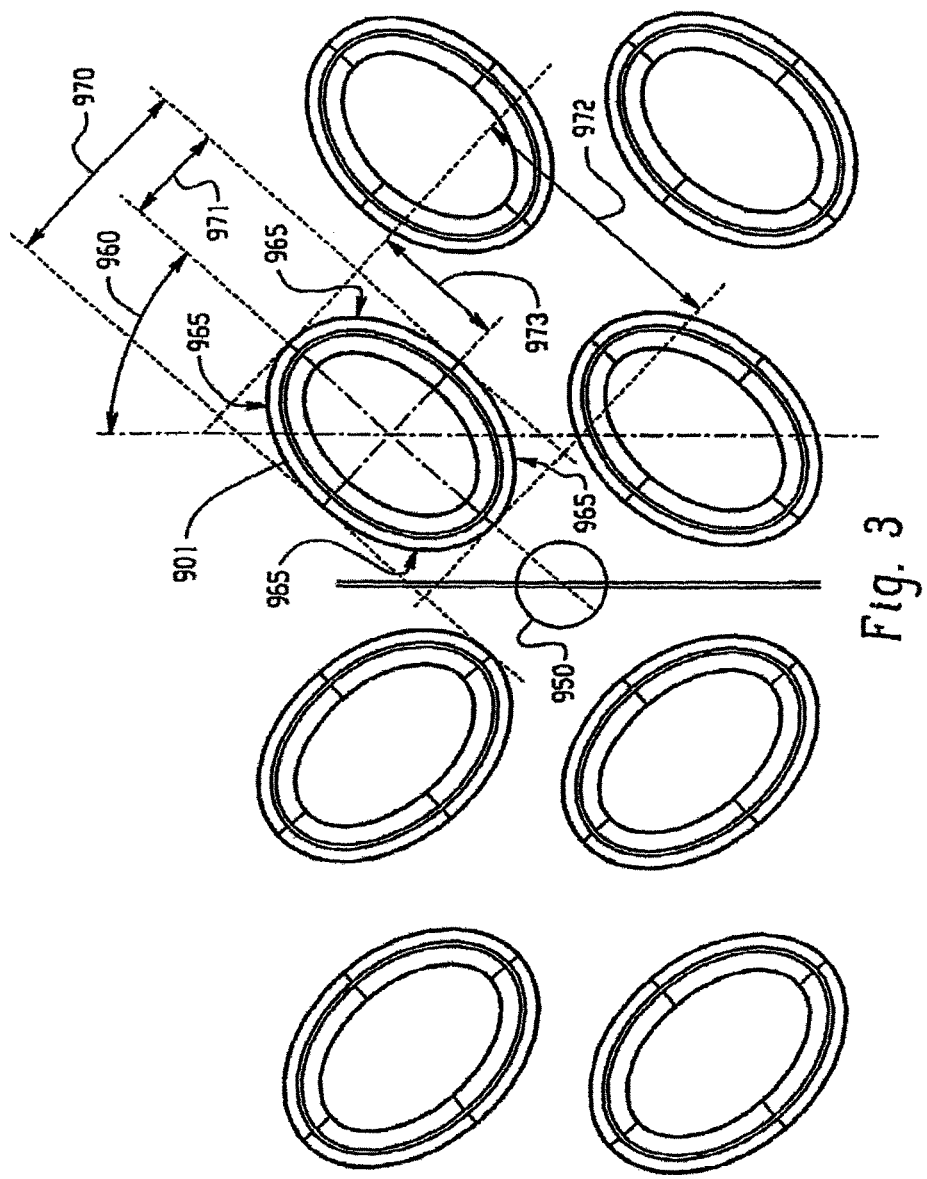
FIG. 3 is a diagram of showing the shape, size and placement of the keys on the keyboard.

FIG. 3 is a view of a subset of the letter keys 901, showing the dimensions and relative position of the keys. Shown also is the point 950 that marks the center of keyboard 900, key dimensions 9'70, 971, 972 and 973, as well as angle 960 and the rho value 965, representing curvature of a letter key 901. In investigating optimal key placement on the keyboard, it was determined that the keys should be placed at an angle 960 relative to vertical that facilitated easy typing using thumbs. As described above with reference to the thumbwheel 1000, "vertical" is the direction perpendicular to the lengthwise direction of the keyboard 900 when the device 10 is viewed in its ordinary operating/viewing position, as shown in FIGS. 2 and 3. That angle is preferably positive 40 degrees relative to vertical for keys on the right side of the keyboard (where 950 is the center of the keyboard) and negative 40 degrees for the keys on the left side of the keyboard, although complementary angles ranging from 20 degrees to 70 degrees could also be used to accomplish the goal, albeit less optimally, of facilitating thumb typing. Also as shown on FIGS. 2 and 3, the keys are dispersed across keyboard 900 evenly so that there is sufficient space between the keys to decrease the opportunity for multiple keys being depressed while thumb typing. Additionally, the keys are size appropriately given the footprint of the messaging device and the keyboard 900. In its preferred embodiment, the messaging device 10 measures across its face 64 mm by 89 mm, which does not leave much room for keyboard 900 and display 500. In the preferred embodiment, keyboard 900 occupies over half of the face of the messaging device 10.

The key shape and dimensions are also key components of the invention. In order to maximize the surface area of the key that a thumb would hit, the keys are preferably oval, and have a rho 965 defining the curvature of the key of .414, although values may range higher or lower. Other rho values will lead to an acceptable, but not as optimal or aesthetically pleasing shape of keys 901. As to the key dimensions, the width 970 of the key 901 is 4.8 millimeters (971 representing the radius of half that value, 2.4 min) and the length (or height) 972 of the key 901 is 7 millimeters (973 representing the radius of half that value, 3.5 mm).

Figure 4:
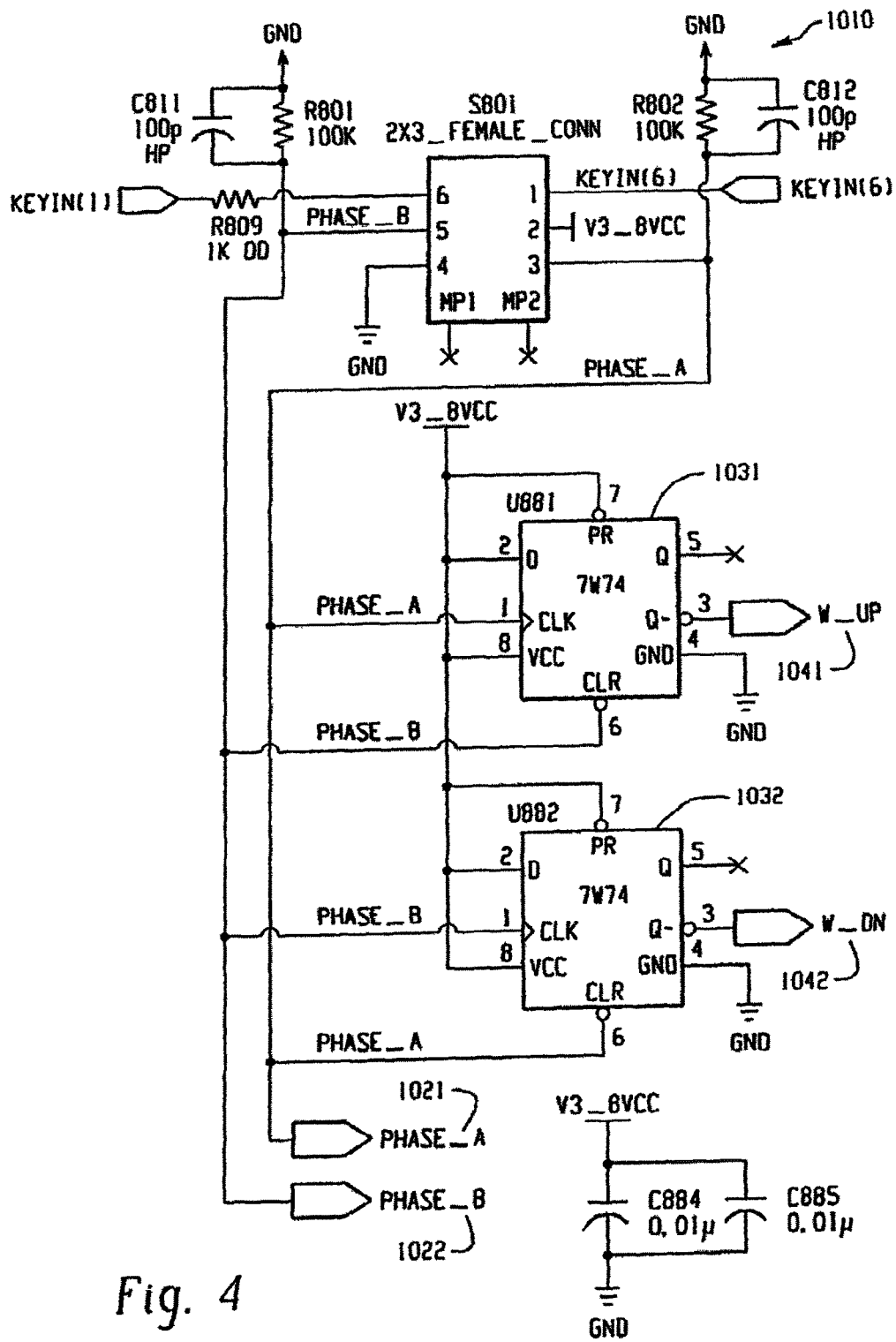
FIG. 4 is a diagram of the control circuitry for the thumbwheel.

FIG. 4 is the logic circuitry 1010 associated with thumbwheel 1000. Thumbwheel 1000 outputs quadrature signals phase A 1021 and phase B 1022, which are processed by D flip-flops 1031 and 1032 to present signals 1041 W_UP and 1042 W_DN to microprocessor 400. Signals 1041 and 1042 represent, respectively, a user rolling the thumbwheel up and rolling the thumbwheel down. Preferably, another detectable input movement from the thumbwheel is desirable. One such input movement implementation would produce an additional input signal derived from pushing the thumbwheel toward the rear of the device. Hence, the thumbwheel of the present invention has preferably measurable rotatable and depressible input movements. Although the description that follows is specifically relating to a thumbwheel input device, it is to be understood that other suitable thumb-based auxiliary input devices having multiple input detectable movements are envisioned and well within tie scope and spirit of the present invention.

In a broad aspect of the invention, input via keys on the keyboard in conjunction with software residing in the flash memory 600 also facilitates the device's operation with the user's thumbs. In another broad aspect of the invention, input via the thumbwheel 1000 and a key on the keyboard in conjunction with software residing in the lash memory 600 further increases the ease, performance ,and functionality of the device. These two broad aspects and their specific embodiments will now be described.

Figure 5:
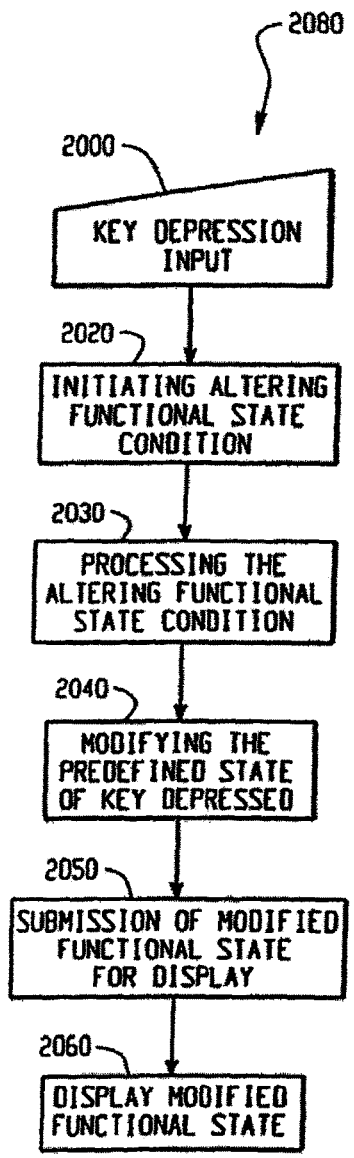
FIG. 5 is a general flow diagram of the major steps of the keyboard-related aspect of the invention.

FIG. 5 is a general flow diagram of the major steps 2080 of the aforesaid keyboard related aspect of the invention. The first step 2000 is the input via depressing of a key having a predefined functional state in combination with another key on a keyboard. Depending on the combination of keys depressed, an altering functional state condition is then initiated at step 2020. The altering functional state condition is processed at step 2030. Next, the predefined functional state of the key is modified at step 2040. In step 2050, the modified functional state is interpreted, and information is displayed accordingly at 2060.

Figure 6:
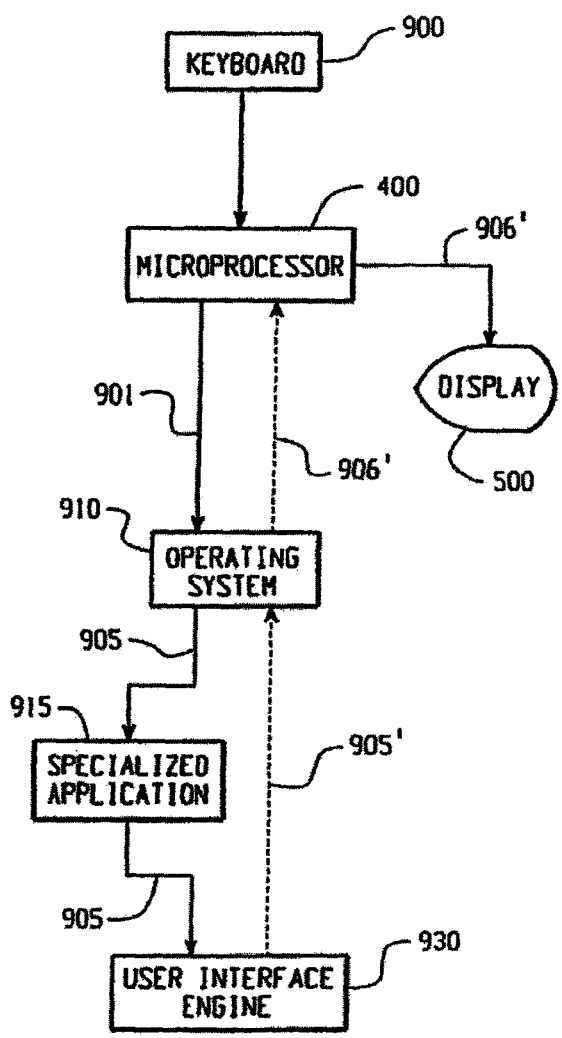
FIG. 6 is a general block diagram of the major subsystems involved in the process described in FIG. 5.

FIG. 6 is a general block diagram of the major subsystems involved in the process described in FIG. 5. In the preferred embodiment of the device, when a key is depressed its predefined functional state 901 is given to the microprocessor 400 and then to the operating system 910. The operating system is responsible for accepting and dispatching to a specialized application 915 any user input and for providing services to control the display. The modifying step is achieved by a user interface software engine 930 processing the altering functional state condition 905 received from the operating system 910 via a specialized application 915. The modified functional state 905' is Then passed to the operating system 910. The operating system then acts on the information in a predetermined manner so as to produce a display 906' representing the modified functional stage of the depressed key.

In the preferred embodiment of the invention, there is a plurality of specialized applications 915 that manage different major features of the device. In such a preferred embodiment, the device would include the following specialized applications: a graphical ribbon application, message compose application, transport application, address book application, device options application, cryptographic application and database application. Other applications are well within the scope and spirit of this aspect of the invention. The applications function directly with the operating system while the user interface engine (albeit another application), in general, provides further specialized functional services to these applications. The user interface engine comprises, in essence, a plurality of modules each nodule executing at least one different function, and either alone or in combination with another module, providing additional functionality to the applications that use its services. For instance, the user interface engine provides an input field that other applications such as the message compose application can use to display user input. Additionally, the user interface engine -receives, stores, manages and outputs data in a consistent manner to readily perform the various specific features to be described below. This scheme has proven to be very advantageous in view of the fact the operating system and the specialized applications may then be limited in their coding overhead and hence allows them to be very robust. Some of the unique functions will be described in more detail below.

Keypad Aspect Generally

The process logic detail is now described for any keypad event-resulting from user input.

When any key on the device is depressed, a keypad event containing the parameters of the particular key is communicated to the microprocessor. In this instance, "any key" includes the thumbwheel in addition to the keys on the keyboard. Preferably, the parameters indicate that a keypad event has occurred and which key has been depressed. The microprocessor communicates the keypad event information to the operating system. The operating system takes this keypad event information and notifies a specialized application of the keypad event information. Since, preferably, the specialized application is blocked waiting for such a keypad event, the application is awakened, examines the keypad event information, and passes the keypad event information to the user interface engine for further processing. In essence, the keypad event information is passed to the user interface engine from the operating system via the specialized application: the specialized application in this case acts as a conduit for information flow. In other instances, the specialized application may pre-process the keypad event information before passing the same to the user interface engine. Based on the keypad event information provided to the user interface engine, the user interface engine then acts in a predetermined functional manner. The pre-determined functional manner preferably includes processing the keypad event information and updating stored display data so as to provide output instruction data. The user interface engine submits the output instruction data to the operating system. The operating system then acts according to the instructions in the instruction data, in most cases, by submitting for display a representation of the keypad event. The output instruction data would preferably include instructions as to where characters are to be displayed within the display and a character code reference value indicating which character should be displayed on the display. In other cases, a plurality of character code references may be provided for producing a display of a string of characters. The preferred character code reference is the standard Latin One Code Set. The operation, system would simply execute the instructions by mapping the appropriate characters from its internal bitmap of characters into the appropriate locations on the display.

Auxiliary Input Device Aspect

Figure 7:
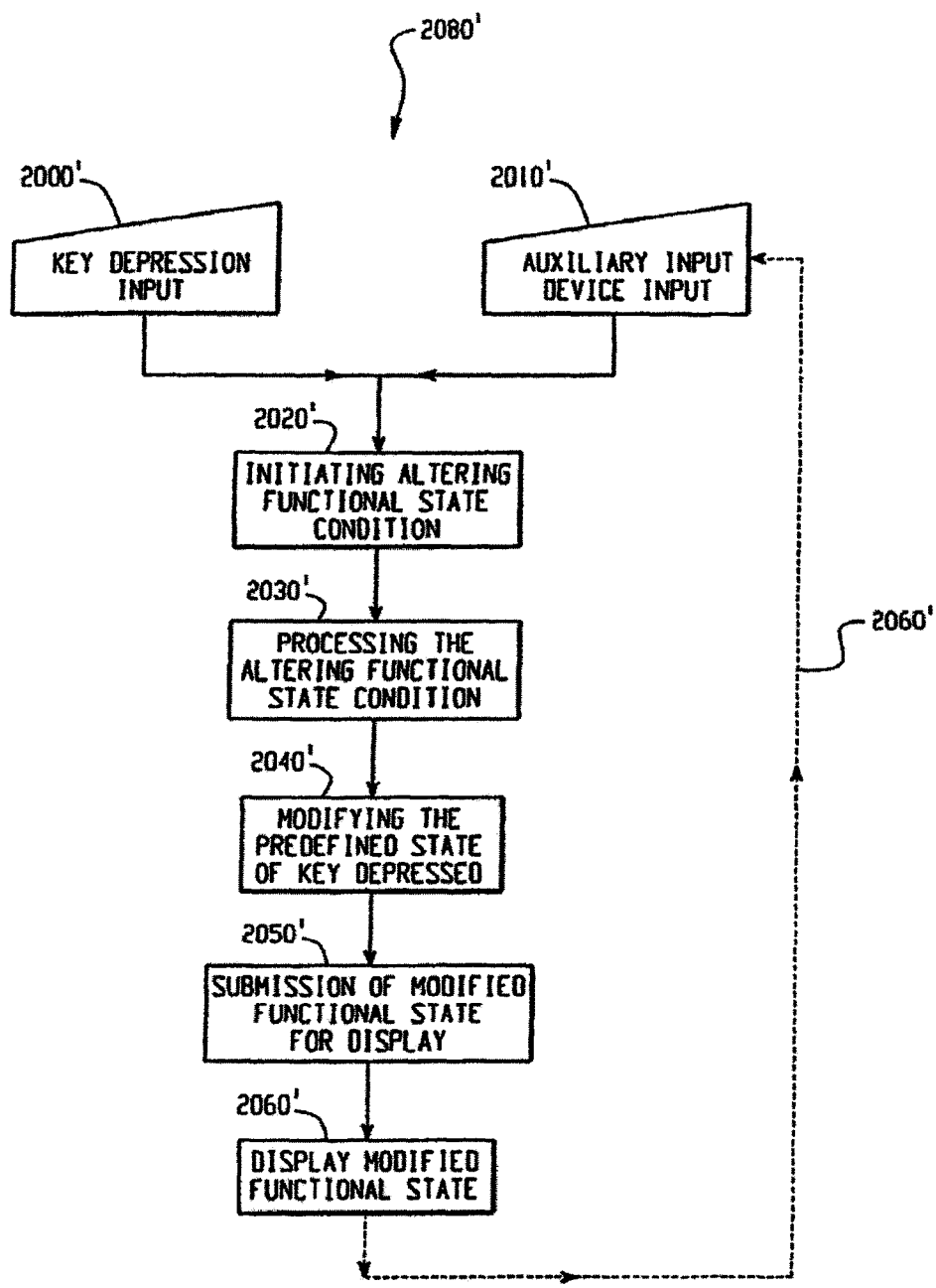
FIG. 7 is a general flow diagram of the major steps of the thumbwheel-related aspect of the invention.
Figure 8:
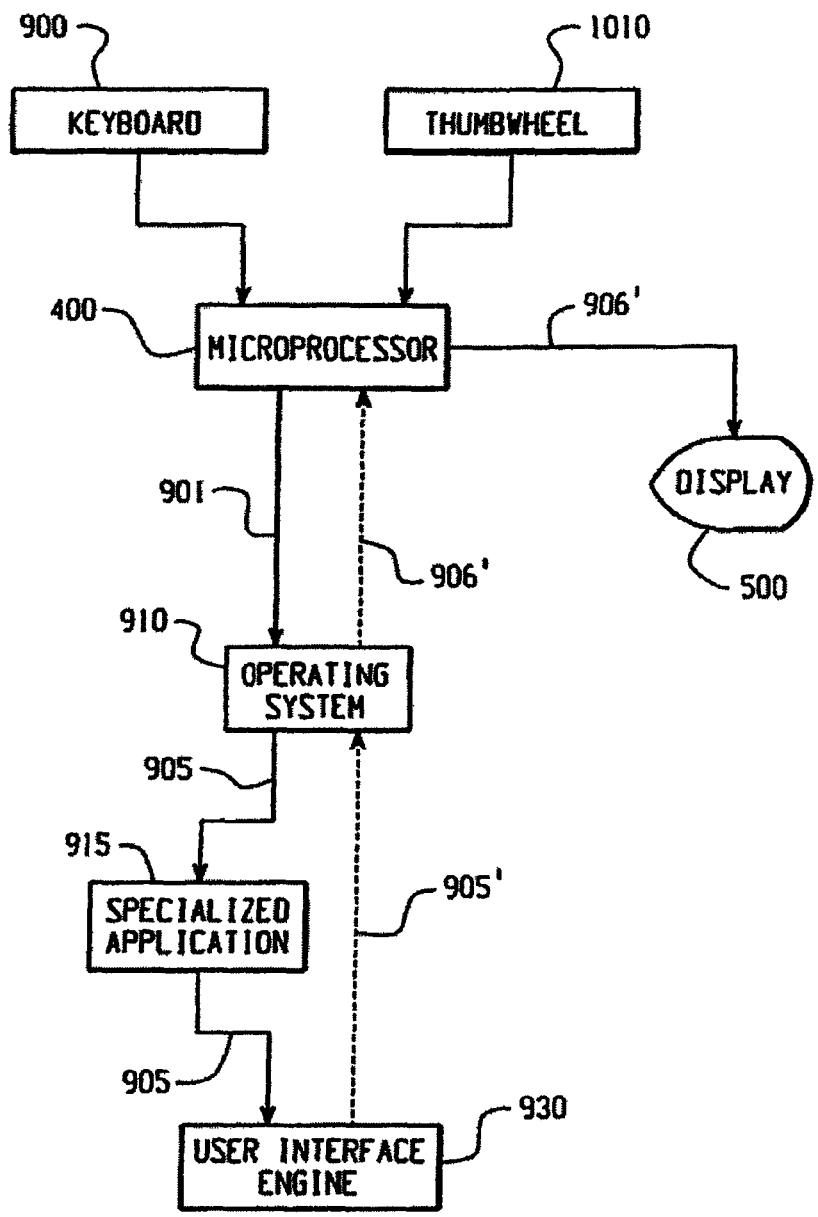
FIG. 8 is a general block diagram of the major subsystems involved in the process described in FIG. 7.

FIG. 7 is a general flow diagram of the major steps of the auxiliary input device-related aspect of the invention The process 2080' begins with a first input 2000' via the depressing of a key on a keyboard having a predefined functional state. Next, a second input 2010' from the auxiliary input device in conjunction with the depression of the key is provided. This combined effect of the first and second input initiates an altering functional state condition step 2020'. The altering functional state condition is processed 2030' and the predefined functional state of the key is modified 2040'. The modified functional state is then submitted 2050' for display. Additional modified functional stales are accomplished by receiving further inputs 2060' from the auxiliary input device while the depressed key is continued to be depressed. FIG. 8 is a block diagram of the major subsystem involved in the process described in FIG. 7. FIG. 8 is similar to FIG. 6 save for input from the auxiliary input device subsystem now contributing to the altering functional state condition. This aspect of the present invention has proven extremely useful in optimizing the functionality of the handheld device by operation of the device with only the user's thumbs.

International Character-Scrolling Feature

Turning now to a specific embodiment of the aforesaid auxiliary input device-related aspect of the invention, the user interface engine, the thumbwheel and at least one key on the keyboard may be utilized to insert international characters into a user input field such as the input field provided by the user interface engine. in general and preferably, the user first presses and holds down a key with the desired associated international characters while the thumbwheel is rolled. For each rolled input from the thumbwheel, a different international character associated with the depressed key is outputted on the display as a substitute for the previous character displayed. There is preferably a plurality of international characters or symbols associated with every key on the keyboard. When the desired character is displayed, the user releases the depressed key and the desired character remains on the display. Traditional means to select such international characters require a number of additional input steps or the availability of additional keys on the keyboard—requirements undesirable with the present handheld device.

With reference to FIG. 8, the international character-scrolling feature begins with the depression of a key on the keyboard 900 in conjunction with input from the thumbwheel 1010. The input from the thumbwheel is preferably accomplished by rolling the thumbwheel in either the up or down direction. The combined effect of inputs 901 from the key and the thumbwheel produce an altering functional state condition or a special keypad event 905. The parameters associated with this special keypad event 90 include data descriptors that will indicate whether the thumbwheel was either rolled up or down and which key on the keyboard was depressed. The user interface engine 930 processes the special keypad event information by indexing through an array containing references to the international characters associated with the depressed key. The processing incrementally indexes up or down the array (depending on the thumbwheel scroll direction parameter), scares the current array position where the indexing stopped and retrieves the character reference code information stored in the current array position. Preferably, at each index increment, output instruction 905' is submitted to the operating system 910 for display on the display 500. The output instruction preferably includes the reference character code and the location of the character to be displayed on the display. Based on this output instruction, the operating system outputs at the appropriate location a bitmap image 906' for a given reference code from its internal bitmap. If the user chooses to see the next international character associated with the depressed key, the user 20 provides an additional rolling input while continuing to depress the key. This produces a second special keypad event thereby initiating the altering functional state process. Consequently, the above process is related. The user interlace engine processes the keypad parameters from the second special keypad event by further indexing in the appropriate direction by one element from the previously store position within the array. Again, the user interface engine submits to the operating system sufficient information to display the next associated international character retrieved from the array. Further inputs from the thumbwheel would simply repeat the processing until all international characters associated with the depressed key are indexed through after which time the indexing returns to the top of the array.

Although the above description refers to modifying the default character of the key depressed with an international character it is to be understood that the application of this aspect of the invention can equally be applied to modifying the functional state of the depressed key. For instance, a certain special keypad event defined by a certain key depressed in conjunction with input received from the thumbwheel could trigger a macro to be executed thereby altering the functional state of the depressed key. In this instance, a macro is a single instruction provided by the scrolling feature that expands automatically into a set of instructions to perform a particular task. In another instance, the altered functional state of a key could produce any one of the following: a larger font for the display; change the default font type; change subsequent text to bold or italics; cause certain text to blink in a received email transmission; and reverse image certain text. in another instance, the altered the functional state of a key could provide the user with "canned" or pre-set messages that could be readily be used for the purposes of quickly responding to a received message. In another instance, the context of the current active display area of the device may either add, or alternatively, suppress, associated altered states. For example, when a user is in the reply-to-message screen display, depression of the letter "M" with the scrolling input from the thumbwheel would produce an ellipsis or the display as the altered functional state. In contrast, the same key and thumbwheel sequence would instead result in a macro sequence to execute in the options screen display.

Capitalization

Turning to another software-related feature that aids in the device 10 being optimally used for thumb typing is a capitalization feature implemented via software. If a user depresses a key 901, the operating system detects a key down event If the key is released after a period of time, the operating system detects a key up event. If after a key down event, a certain period of time elapses before a key up event is detected, the operating system determines that a key repeat event has occurred representing a situation where a user has continued to depress a key without releasing it. A key repeat event is then treated by application software residing in either flash 600 as an event that requests the capitalization of the key previously depressed. This feature disables the key repeat feature and substitutes instead a capitalization feature based on the length of a key press. The timing of the key scanning to determine whether a key has been released can be set to permit a slower keyboard response or a faster keyboard response, depending upon user experience of preferences.

Although the capitalization function preferably works only to change the state of a letter to a capital, it alternatively could operate to change a capital letter to a lower case letter. The actual display image is changed by the operating system mapping appropriate bitmapped characters as instructed by the user inter-race engine. As alternatively implemented, the continued depressing without release of a letter key could result in a key oscillating between upper case and lower case, depending on the length of time the key is depressed.

Automatic Formatting Features

Now follows a description of another software-related aspect of the present invention that is implemented to specifically minimize the number of keystrokes required as input by the user in using the device. In some cases, two software engines handle this software-related aspect, namely the user interface engine and an autotext engine. The user interface engine by using the above mentioned functional modules facilitates presenting common interface elements such as menus, lists and textboxes. The autotext engine is another software application that extends the user interface engine and makes use of a database to perform text insertions and other related activities. The autotext engine is preferably implemented as a user interface engine element (such as a choice box or list or standard edit element). This arrangement of being a user interface engine element allows specialized applications to incorporate a buffer that performs autotext substitution as they would a standard input field. However, because of the substantive amount of code associated with the autotext engine and the engine's need to be configured with a list of replacement strings, the engine is preferably implemented as a separate module. One specific advantage that flows from the specific embodiments of the engines as described herein is that there is a substantial reduction of input formatting b)/the user, since automatic formatting can be triggered by a small number of keystrokes, or by predefined key sequences entered one key at a time.

Autopunctuation

Another embodiment of the user interface engine is the "autopunctuation" feature of the device. If the user enters one of a number of predefined character sequences, the user interface engine will automatically insert a period (full stop) in the user input field. in this manner the user does not nee! to use the alt key to enter a period. An example of one such character sequence would be <character><space><space>, after such character sequence the user interface engine will instruct the operating system to replace the first <space> with a full stop and to capitalize the next character entered by tie user. For clarity, in this description: <space> represents a blank space user input; <character> represents any character user input; and, <period> represents user input of the character ".". Because of bandwidth considerations when the device transmits data to the wireless network, it is preferable that only one space, instead of two, is present between the period and the first character of the next sentence. Alternatively implemented, instead of replacing the first <space> in the aforesaid character sequence, a period is inserted after the <character> and the next character entered by the user is capitalized thereby producing two spaces between the period and the next character. In another embodiment of this autopunctuation feature, if the user enters one of a number of predefined character sequences that is used as a capitalization signal, such as <period><space>, the user interface engine will-process the event and capitalize the next character entered by the user.

Alternatively implemented, the predefined character sequence could be <period><space><space>. To further enhance this feature, autopunctuation can be undone easily, .as described bellow.

Character Substitution

Another embodiment of the user interface engine is the "intelligent character substitution" feature of the device. In fields designed for certain types of input, the user interface engine will automatically substitute appropriate characters if inappropriate characters are entered. For example, in a field designed to hold an email address, a method of composing an email address is provided by the character substitution feature of the present invention for email address taking on the general form <characters>@<characters>.<characters>. In the instance, it is assumed blank spaces are unacceptable characters for an email address field. The method begins with the user interface engine receiving from user input a character set representing a certain portion of the email address. If a first delimiter trigger signal, preferably a first blank space, is received from the user input, the engine confirms that no at-sign character ("@") has been entered in the already received character set. If no, the engine substitutes the first delimiter trigger signal with a first email delimiter, preferably the at-sign character. If yes, the engine substitutes the first delimiter with a second email delimiter, preferably a period character. For any subsequent blank space input received, the engine substitutes preferably another period character.

Another example of the character substitution feature occurs when entering data in a field designed to hold numeric data. If the user presses an alphabetic key whose corresponding alt character is a numeral, the user interface engine will recognize this and instruct the operating system to automatically insert the numeral into the field, even if the user had not pressed the alt key.

Phrase substitution

The first embodiment of the autotext engine provides an application service for error correction and phrase substitution. By entering pairs of strings into an autotext database, the user can associate "original strings" with "replacement strings". The autotext engine also defines an autotext input meld that applications may use to access the functionality of the autotext engine. The autotext input field may be of variable length typically up to the length of an email message. As the user is entering data into an autotext input field, each time a space is entered, the autotext engine will search backwards from the current cursor position to extract the last word from the autotext input field. The autotext engine will then efficiently search through the autotext database for an original string that exactly matches the last word. If such a string is found, the last word in the autotext input field will automatically be replaced with the corresponding replacement string from the database.

This phrase substitution feature could be used to correct common typing errors (for example, "the" could be automatically converted to "the") or to facilitate the entry of common phrases (for example, "fyi" could be automatically converted to "for your information"). This feature could also automatically insert a regularly used international character or symbol in a message thereby reducing the instances when the international character-scrolling feature needs to be used. In this latter scenario, the original string could be "jr" and the associated replacement string could be "Jürgen". The international character would be entered as described before for the international character scrolling feature.

The phrase substitution feature could advantageously be used or electronic signatures to be appended to the end of an email message composed by the user on the device. Advantageously, a variety of different electronic signatures can be stored in the autotext database. In this manner, the user may chose the appropriate signature from his set of signatures for the particular context of the email message about to be transmitted. For instance, in one case the user in an informal message may sign off "Take Care & Cheers" with the original string "tc" while in a legally sensitive message the same user may sign off "Solicitor-Client Privileged Communication" with the original string "scp". In this manner, there is no need for any electronic signature field insertion at the gateway of the wireless network and the user may amend and modify his electronic-signatures without network interaction. In the preferred embodiment, the replacement string is case sensitive in that any preset capitalization in the replacement string appears when displayed and cannot be forced into a lower case by the case status of the original string. However, if the first character of the original string is tipper case, then preferably the first character of the replacement is forced into an upper case as well.

In another embodiment, the autotext engine preferably includes a macro functionality that allows a user to specify special character codes in the replacement string that will be treated specially when the replacement string is entered into the autotext engine. These codes are preferably divided into two distinct sets: control character codes and dynamic data codes.

In the control character code situation, some character sequences in the replacement string will be converted to control characters when the original string is replaced by the substitution feature. Examples of these sequences would be "%b" and "%B" which convert to a backspace character and a delete character respectively. Therefore, for an open bracket "(" to be displayed, the original string could be defined as "br" and the replacement string as "(%3". Likewise, for a close bracket ")", the original string could be "rb" and the replacement string "%b)".

In the dynamic data code situation, certain character sequences in the replacement string will be converted to dynamic data when the original string is replaced. Examples of these sequences would be " %t" and "%d" wherein the codes are converted into the current time and current date respectively.

Like the intelligent character substitution feature, autotext replacement can be undone easily, as described bellow.

Undo Feature

As mentioned above, all automatic formatting features of the user interface and autotext engines such as autocapitalization, autopunctuation and phrase substitution may be overridden by what is referred to the "easy undo" feature herein. The automatic formatting features have undo capabilities that are triggered by backspacing over a significant character. As such, if the user backspaces over one of these significant characters, the formatted data is replaced with the raw data as it existed prior to automatic formatting.

For instance, the user may type "fyi" into an autotext input field such one implemented in 0 the message compose screen. If then the user types <space> and "fyi" is in the autotext database, the autotext engine will replace "fyi" with "for your information" in the input field as earlier described in phrase substitution. If the user does not desire this substitution, the user can preferably backspace over the last character of the displayed string "for your information". Consequently, the autotext engine will restore the contents of the input field to "fyi" as they were prior to the phrase substitution formatting operation. In this instance, the significant character was the last character "n" in the phrase "for your information".

If the user types a sequence of characters that results in an automatic formatting operation, and backspaces to activate the easy undo feature, the appropriate engine will retain the fact that an undo operation took place at that significant character position. Consequently, if the user retypes the same sequence of characters, then the automatic formatting will not be applied for a second time. This allows the user to suppress an automatic formatting feature when desired.

For example the user may suppress the autopunctuation feature from inserting a fill stop automatically. As described above, if the user types <space><space>in an input field, a full stop will be inserted by the user interface engine for the first <space>. If the user does not desire a full stop in that location, the user would then backspace over the full stop character and retype <space><space>. The user interface engine will not replace the full stop as it did the first time.

Navigation Aids

The device software provides a number of navigation aids for most user input tasks. The navigation aids maximize the likelihood that there will be a graphical interface that the user finds intuitive. The aids allow most input tasks to be performed completely using either the keyboard or the thumbwheel. The navigation aids are preferably incorporated into choice boxes and menus of the device software. A choice box is graphical interface wherein only one selection is displayed at one tune. The other possible selections are displayed one at a time by a navigation means. A menu, on the other hand, is a graphical interface wherein all selections for a particular input are displayed at one time. There are other instances where the navigation aids may be used and such applications are within the scope of the invention.

As a first aid, the user may cycle through all available options in a choice box by pressing the space bar. For instance, in a box containing the months of the year, pressing the space bar repeatedly will change the selection from "January' to "February" to "arch", etc. A keypad event, defined by the location of the cursor being in a choice box and the depression of the space bar, would trigger the altering functional state process. As a result, the user interface engine would process the event by indexing though a choice array associated with the choice box and provide to the operating system instructions to display the next available option.

As a second aid, the user may also cycle through the data by pressing a control key and rolling the thumbwheel. The control key is preferably the "alt" key 902. Other control keys are possible and within the scope of the invention. This navigation method allows more flexibility for the user because the user can cycle through data in either direction in the choice array. This navigation is similar to the aforesaid international character-scrolling embodiment. instead of international characters associated with the key depressed, the software displays a list of options. Preferably, in the downward scrolling direction, the user interface engine will move through the list of choices in the same direction as it would have if the space bar had been pressed. In the upward scrolling direction, the user interface engine will move backwards through the list of choices (e.g. "March" to "February" to "January", etc.). Hence, the alt Key's defined function of producing for 2 0 display an alternate character for a key has been altered by the keypad event triggered by the thumbwheel and the alt key inputs. In the case of a menu display, the user can move the cursor between items in the menu by depressing a character key. If a menu item exists beginning with the character, the cursor will be positioned automatically over the first item in the menu beginning with that character. If there are multiple menu items beginning with that character, pressing the key repeatedly will cycle it through those menu items. When the cursor is positioned over the desired item, the user can select it by pressing the Enter key. If the user decides that he does not want to select any menu item, but instead return to his previous position in the application, he can again select the "Hide Menu" item or press the backspace key, and the menu will be dismissed.

Another navigation aid is available when the cursor is positioned over a specific choice box that changes options by allowing the user to cycle through the options in the choice box by only rolling up or down without depressing the alt key. Similarly, when a menu is displayed, the user can move the cursor up or down in the menu by rolling the thumbwheel, respectively, up or down. When the cursor is positioned over the desired menu item, the user can select it by pressing the roller wheel toward the back of the device (called clicking the wheel). If the user decides that he does not want to select any menu item, but instead desires to return to his previous position in the application, preferably, he can select the "Hide Menu" item, and the menu will be dismissed. Preferably, the user can also dismiss the menu by pressing the backspace key.

Another navigation aid utilizes the uniqueness of the first character of each choice listed in a choice box. If the user depresses a key and there exists a possible choice beginning with the character represented by the key, that choice will automatically be selected without any further input required by the user. if there are multiple choices beginning with that letter, pressing the key repeatedly will cycle through the available choices. For example, in a month choice box, pressing "j" will first select "January", then "June" and then "July". Alternatively implemented, rapid keystrokes could result in a narrower search. For instance, rapidly pressing "ju" would result in "June" and then "July".

Thumbwheel Orientation

As described above with reference to FIG. 2, the communications device 10 has a vertical thumbwheel 1000. As shown in FIGS. 9-12, an alternative embodiment of the invention comprises a device 4000 with an inclined thumbwheel 4002.

Like the device 10, the device 4000 is a hand-held communications device which, as viewed directly from the front in FIG. 9, has an ordinary operating/viewing position in which it is normally held by and between the user's left and right hands at the left and right side edges 4004 and 4006 of the device 4000. The keyboard 4008 is thus elongated horizontally across the front 4010 of the device 4000 at a location between the display 4012 and the lower edge 4014 of the device 4000. Further like the device 10, the device 4000 includes a microprocessor with a software application for providing a plurality of thumb-based operational features upon certain inputs from the keyboard 4008 and the thumbwheel 4002, as described above.

The housing 4020 of the device 4000 has front and rear sections 4022 and 4024. The thumbwheel 4002 projects outward through a slot-shaped opening 4026 in the front section 4022 of the housing 4020. The opening 4026 interrupts the corner of the housing 4020 between the front 4010 and the right side edge 4006 of the device 4000, and is elongated lengthwise of the right side edge 4006. The opening 4026 is thus configured to provide clearance for the thumbwheel 4002 to project from both the front 4010 and the right side edge 4006 of the device 4000 in its inclined orientation. This places the peripheral surface 4030 of the thumbwheel 4002 in an orientation in which it is clearly visible from directly in front of the device 4000 when a user holds the device 4000 in its ordinary operating/viewing position, as shown in FIG. 9. Importantly, the peripheral surface 4030 of the thumbwheel 4002 is easily accessible, i.e., reachable, by the right thumb at the front 4010 of the device and also by the right index finger when the device is held, preferably, in the palms of two hands. Also, the peripheral surface 4030 of the thumbwheel 4002 is accessible by the right thumb at, for instance, the right side edge 4006 of the device when the device is held in one hand. The present invention provides optimum positioning between a vertically-aligned thumbwheel and horizontally-aligned thumbwheel; thereby, allowing the user to operate the thumbwheel in either a single-hand operation or two-handed operation.

As best shown in FIG. 11, the thumbwheel 4002 is inclined at a specified angle A from the vertical orientation of the thumbwheel 1000 (FIG. 2). The angle A is preferably 70 degrees. With its axis 4031 of rotation in this orientation, the thumbwheel 4002 can roll up toward the upper end 4032 of the device 4000, and down toward the lower end 4014, in a manner similar to the up and down rolling movement of the thumbwheel 1000. However, the rolling movement of the thumbwheel 4002 further has directional components extending across the front 4010 of the device 4000 between the opposite side edges 4004 and 4006 as a result of its inclination from the vertical orientation of the thumbwheel 1000. This enhances the ability of the user to manipulate the thumbwheel 4002 with either the thumb or index finger of the right hand.

Figure 12:
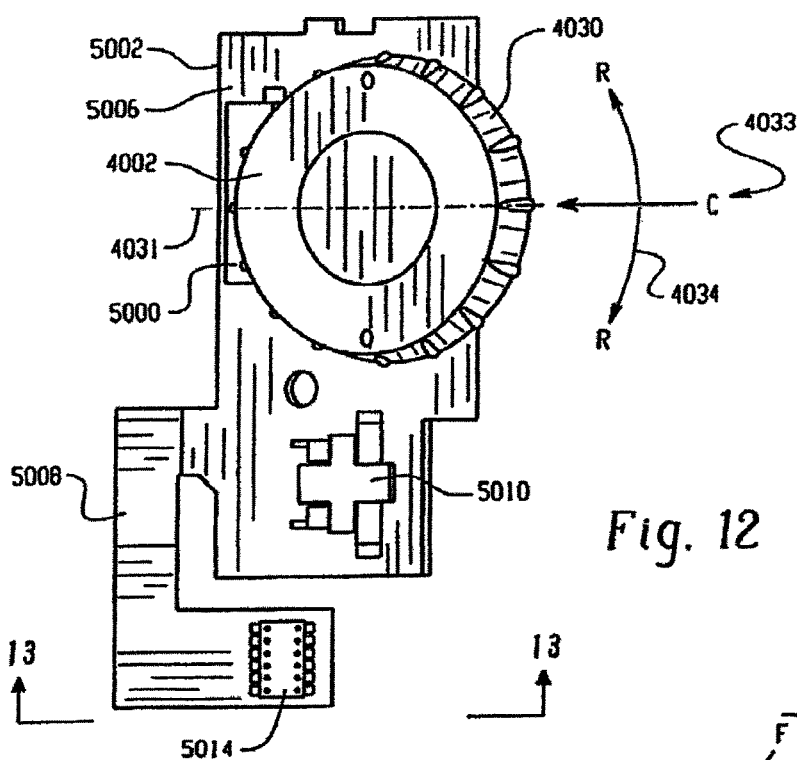
FIG. 12 is a front view of parts of the device of FIG. 9.
Figure 13:
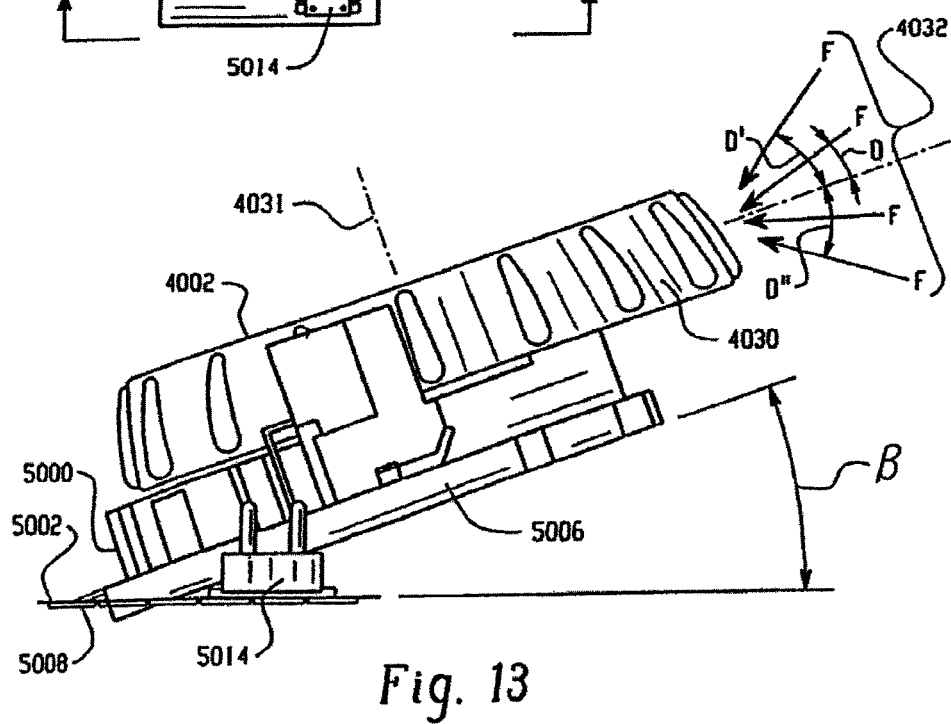
FIG. 13 is a view taken on line 13-13 of FIG. 12.

A structure for supporting the thumbwheel 4002 within the housing 4020 is shown in FIGS. 12 and 13. An important advantage of the inclined thumbwheel 4002 is that thickness of the housing (i.e., the distance between the front surface 4010 and the rear surface 4011) is minimized; thereby, allowing the overall dimensions of the device 4000 to be sleeker than if the thumbwheel 4026 were vertically positioned. The supporting structure includes a rollerwheel switch assembly 5000 and a printed circuit board (PCB) 5002. These parts 5000 and 5002 are configured to interconnect the thumbwheel 4002 operatively with the main PCB 5004 (shown schematically in FIG. 11).

The PCB 5002 has first and second portions 5006 and 5008. The two portions 5006 and 5008 of the PCB 5002 are inclined relative to each other at a specified angle B which is complementary to the angle A of FIG. 11. In the preferred embodiment, the angle B is 20 degrees. The rollerwheel switch assembly 5000 supports the thumbwheel 4002 on the first portion 5006 of the PCB 5002 for rotation about the axis 4031, as indicated by the R arrows 4034, and also for clicking input movement in a direction perpendicular to the axis 4031, as indicated by the C arrows 4033 shown in FIG. 12. An additional advantage of the present invention is the ability to execute the clicking input movement in a plurality of angular positions of the user's thumb or index finger as illustrated by the input arrows F 4032 and associated angles D, D', and D" in FIG. 13. All .that is required to engage the rollerwheel switch assembly 5000 to acknowledge a clicking input movement is sufficient force in the direction perpendicular to the axis 4031. In this manner, some of the additional advantages described above relating to easy access via a single-hand or a dual-hand mode operation of the device 4000 is further enhanced. The plurality of angular positions by which the user may engage the thumbwheel 4002 for input allows for greater freedom and ergonomic flexibility for the user. Such freedom and ergonomic flexibility is not found in traditional handheld devices having a thumbwheel. An escape switch 5010 also is mounted on the first portion 5006 of the PCB 5002, and is acuatable by a button 5012 (FIG. 9) in a known manner. A connector 5014 is mounted on the second portion 5008 of the thumbwheel PCB 5002 to connect the second portion 5008 directly with the main PCB 5004 in an orientation parallel to the main PCB 5004. The first portion 5006 of the thumbwheel PCB 5002 then supports the thumbwheel 4002 in the inclined orientation described above.

Having described in detail the preferred embodiments of the present invention, including the preferred methods of operation, it is to be understood that the preferred embodiments are presented only by way of example and are not meant to limit the scope of the present invention that is defined by the following claims.

The invention claimed is:

1. A method performed by a mobile device, the method comprising:
   receiving a first set of characters and displaying the first set of characters, wherein a last character of the first set of characters is not a period, and the first set of characters is received through a keyboard including a plurality of keys with each key representing a single letter;
   in response to receiving a space twice in succession following the last character of the first set of characters and without receiving a period character as the last character of the first set of characters, displaying a period after the last character of the first set of characters and displaying at least a space after the period, wherein no character in the first set of characters is replaced with another character when the period is displayed after the last character of the first set of characters; and
   receiving a second set of characters through the keyboard and displaying the second set of characters after the displayed period and after the displayed space following the displayed period, wherein a first character of the second set of characters is automatically capitalized.

2. A method as set forth in claim 1, wherein the first set of characters is part of a first sentence.

3. A method as set forth in claim 1, wherein the second set of characters comprises a second sentence.

4. A method as set forth in claim 1, wherein receiving the first set of characters comprises:
   receiving a first input reflecting a selection of one or more input elements of the keyboard of the mobile device.

5. A method as set forth in claim 1, wherein receiving the second set of characters comprises:
   receiving a second input reflecting a selection of one or more input elements of the keyboard of the mobile device.

6. A mobile device comprising:
   a display;
   a memory for storing instructions; and
   at least one processor for executing the stored instructions to:
      receive a first set of characters and display the first set of characters, wherein a last character of the first set of characters is not a period, and the first set of characters is received through a keyboard including a plurality of keys with each key representing a single letter;
      in response to receiving a space twice in succession following the last character of the first set of characters and without receiving a period character as the last character of the first set of characters, display a period after the last character of the first set of characters and display at least a space after the period, wherein no character in the first set of characters is replaced with another character when the period is displayed after the last character of the first set of characters; and
      receive a second set of characters through the keyboard and display the second set of characters after the displayed period and after the displayed space following the displayed period, wherein a first character of the second set of characters is automatically capitalized.

7. A mobile device as set forth in claim 6, wherein the first set of characters is part of a first sentence.

8. A mobile device as set forth in claim 6, wherein the second set of characters comprises a second sentence.

9. A mobile device as set forth in claim 6, wherein the processor executes instructions to receive the first set of characters by receiving a first input reflecting a selection of one or more input elements of the keyboard of the mobile device.

10. A mobile device as set forth in claim 6, wherein the processor executes instructions to receive the second set of characters by receiving a second input reflecting a selection of one or more input elements of the keyboard of the mobile device.

11. A mobile device comprising a display for displaying a user interface, the user interface configured to:
   receive a first set of characters and displaying the first set of characters, wherein a last character of the first set of characters is an alphanumeric character, and the first set of characters is received through a keyboard including a plurality of keys with each key representing a single letter;
   in response to receiving a space twice in succession following the alphanumeric last character of the first set of characters and without receiving a period character as the last character of the first set of characters, display a period after the last character of the first set of characters and display at least a space after the period, wherein no character in the first set of characters is replaced with another character when the period is displayed after the last character of the first set of characters; and receive a second set of characters through the keyboard and display the second set of characters after the displayed period and after the displayed space following the displayed period, wherein a first character of the second set of characters is automatically capitalized.

12. A mobile device as set forth in claim 11, wherein the first set of characters is part of a first sentence.

13. A mobile device as set forth in claim 11, wherein the second set of characters comprises a second sentence.

14. A mobile device as set forth in claim 11, wherein the mobile device is configured to receive the first set of characters by receiving a first input reflecting a selection of one or more input elements of the keyboard of the mobile device.

15. A mobile device as set forth in claim 11, wherein the mobile device is configured to receive the second set of characters by receiving a second input reflecting a selection of one or more input elements of the keyboard of the mobile device.

* * * * *

UNITED STATES PATENT AND TRADEMARK OFFICE
CERTIFICATE OF CORRECTION

| | |
|---|---|
| PATENT NO. | : 9,703,390 B2 |
| APPLICATION NO. | : 13/926014 |
| DATED | : July 11, 2017 |
| INVENTOR(S) | : Jason Tyler Griffin et al. |

It is certified that error appears in the above-identified patent and that said Letters Patent is hereby corrected as shown below:

Column 1, Line 5: Delete "May." and insert -- May --, therefor.

Column 1, Line 10: Before "Apr." insert -- filed --.

Column 1, Lines 12-13: Before ""Hand-Held" delete "continuation-in-part of U.S. patent application Ser. No. 29/108,876, entitled".

Signed and Sealed this
Twenty-second Day of August, 2017

Joseph Matal
*Performing the Functions and Duties of the
Under Secretary of Commerce for Intellectual Property and
Director of the United States Patent and Trademark Office*